(12) United States Patent
Putze (10) Patent No.: US 9,420,458 B2
(45) Date of Patent: Aug. 16, 2016

(54) METHOD FOR THE USE OF A MOBILE APPLIANCE USING A MOTOR VEHICLE

(75) Inventor: Markus Putze, Menlo Park, CA (US)

(73) Assignee: Volkswagen AG, Wolfsburg (DE)

( * ) Notice: Subject to any disclaimer, the term of this patent is extended or adjusted under 35 U.S.C. 154(b) by 175 days.

(21) Appl. No.: 12/966,802

(22) Filed: Dec. 13, 2010

(65) Prior Publication Data

US 2012/0151214 A1    Jun. 14, 2012

(51) Int. Cl.
| | | |
|---|---|---|
| *H04W 12/06* | (2009.01) | |
| *H04L 29/06* | (2006.01) | |
| *H04L 9/08* | (2006.01) | |
| *H04L 9/30* | (2006.01) | |
| *H04W 12/04* | (2009.01) | |
| *H04W 12/02* | (2009.01) | |
| *H04W 4/04* | (2009.01) | |

(52) U.S. Cl.
CPC ........... *H04W 12/06* (2013.01); *H04L 63/0823* (2013.01); *H04W 4/046* (2013.01)

(58) Field of Classification Search
CPC ..... H04L 63/0823; H04L 9/3294; H04L 9/08; H04L 9/30; H04W 12/04; H04W 12/06; H04W 12/02; G06F 21/33
USPC .......... 713/156–157, 173, 175–176; 380/247, 380/258, 277; 726/10
See application file for complete search history.

(56) References Cited

U.S. PATENT DOCUMENTS

| | | | | |
|---|---|---|---|---|
| 6,980,660 | B1* | 12/2005 | Hind | H04L 63/0823 380/277 |
| 7,376,835 | B2* | 5/2008 | Olkin et al. | 713/168 |
| 2003/0023858 | A1* | 1/2003 | Banerjee et al. | 713/189 |
| 2006/0148533 | A1* | 7/2006 | Tanneberger | H04W 88/02 455/569.1 |
| 2008/0148374 | A1* | 6/2008 | Spaur | B60R 25/04 726/6 |
| 2010/0037057 | A1* | 2/2010 | Shim | H04L 63/0823 713/171 |
| 2010/0064136 | A1 | 3/2010 | Longobardi et al. | |
| 2010/0127996 | A1 | 5/2010 | Kitahara et al. | |

(Continued)

FOREIGN PATENT DOCUMENTS

| | | |
|---|---|---|
| DE | 10319365 | 11/2004 |
| JP | 2010130369 A | 6/2010 |

(Continued)

OTHER PUBLICATIONS

International Search Report for PCT/EP2001/006181 dated May 23, 2012.

(Continued)

*Primary Examiner* — Tae Kim
*Assistant Examiner* — Shiuh-Huei Ku
(74) *Attorney, Agent, or Firm* — Barnes & Thornburg LLP (57) ABSTRACT

The invention relates to a method for the use of a mobile appliance which is not associated with a motor vehicle using a motor vehicle, wherein a program which can be executed on the mobile appliance and a digital certificate associated with the program are stored in the mobile appliance, wherein the digital certificate is transmitted from the mobile appliance to the motor vehicle, wherein the digital certificate is verified in the motor vehicle, wherein—if verification of the digital certificate is successful—information associated with the program which can be executed on the mobile appliance is presented using a display in the motor vehicle, and wherein the program which can be executed on the mobile appliance is used using a user arrangement, associated with the display, in the motor vehicle.

25 Claims, 5 Drawing Sheets

(56) References Cited

U.S. PATENT DOCUMENTS

| | | | |
|---|---|---|---|
| 2011/0047384 A1* | 2/2011 | Jacobs et al. | 713/176 |
| 2011/0295444 A1* | 12/2011 | Westra | G06F 21/554 701/1 |
| 2012/0095643 A1* | 4/2012 | Bose et al. | 701/32.8 |

FOREIGN PATENT DOCUMENTS

| | | |
|---|---|---|
| KR | 2001-0114272 A | 12/2001 |
| WO | 9930228 | 6/1999 |
| WO | 00/72506 A1 | 11/2000 |
| WO | 2004/068424 A2 | 8/2004 |
| WO | 2006/063602 A1 | 6/2006 |

OTHER PUBLICATIONS

English Translation of Written Opinion of the International Search Authority for International Patent Application No. PCT/EP2011/006181, dated Dec. 8, 2011.

\* cited by examiner

METHOD FOR THE USE OF A MOBILE APPLIANCE USING A MOTOR VEHICLE

BACKGROUND

The invention relates to a method for the use of a mobile appliance which is not associated with a motor vehicle, particularly a mobile telephone, using a motor vehicle. The invention relates particularly to a method for the use of a mobile appliance which is not associated with the motor vehicle, particularly a mobile telephone, in a terminal mode.

EP 0 760 188 B1, which is incorporated herein in its entirety by reference, discloses an apparatus for use with a predetermined first mobile telephone from a plurality of different types of mobile telephones, wherein the apparatus has a first pocket adapter which is separate from the first mobile telephone and a common base unit, which is separate from the pocket adapter, wherein the pocket adapter comprises a reception section for use when the first telephone is being held, an electrical interface, a connecting arrangement for electrically connecting the first telephone to the electrical interface, and an appliance for storing information which is related to an identity of the first mobile telephone.

EP 0 559 187 B1, which is incorporated herein in its entirety by reference, discloses a mobile telephone unit having a portable mobile telephone having an associated connector and having a buffer unit for mounting the portable mobile telephone and containing a buffer unit connector which can be connected to the external connecting connection of a communication unit.

Motor vehicles having a telephone user apparatus for the use of a mobile telephone using a wireless communication link between the telephone user apparatus and the mobile telephone are known from DE 10 2005 058 636 A1 and WO 2004/038887 A1, for example.

Use of a mobile device in terms of a terminal mode discloses, e.g., U.S. Pat. No. 7,324,833 B2, which is incorporated herein in its entirety by reference, an audio system, comprising: a portable electronic device having a display, a memory, and an audio file player, a first portion of software saved at the portable electronic device and configured to initiate displaying of a graphical interface item on the display, the graphical interface item comprising a name associated with an audio file saved in the memory; a mounting location on the portable electronic device that includes a physical interface configured to communicatively couple the portable electronic device to a different electronic device having an associated display; and another portion of software saved at the portable electronic device and configured to communicate a representation of the graphical interface item to the different electronic device via the physical interface to facilitate a displaying of the representation on the associated display, wherein the portable electronic device is configured to communicate interface information to the different electronic device in order to allow a user to view at least a partial representation of a graphical user interface that includes the graphical interface item on the associated display, wherein the graphical user interface comprises a plurality of preprogrammed soft buttons that are linked to respective audio information sources.

DE 100 08 973 B4 discloses a method for safeguarding the data integrity of a piece of software for a controller in a motor vehicle in which a memory can be used to store a piece of software which influences the mode of action of the controller, wherein the following steps are provided:

a controller key pair having a first and a second key is provided, and a particular number n of certificate key pairs having a first and a second key, respectively, are provided, the first key of the controller key pair is lodged in or for the controller in the motor vehicle, certificates corresponding to the particular number n are produced, each certificate comprising a certificate information item and said certificate information item for the last certificate storing at least one key for checking the software and—if a plurality of certificates are used—the other certificate information items storing at least one key for checking the subsequent certificate, the certificate information item for the first certificate is signed using the second key of the controller key pair and—if more than one certificate is available—the other certificates are signed using the respective second key of a certificate key pair, the respective first key of which is stored in the certificate information item for the preceding certificate, a piece of software to be loaded afresh is signed using the second key of a certificate key pair, the first key of which is stored in the certificate information item for the last certificate, all the signed certificates are loaded into the controller, the signed software is loaded into the controller, the signature of the first certificate is checked using the first key, which has been lodged in or for the controller, of the controller key pair, and, if more than one certificate is available, the signature of each further certificate is checked using the first key contained in the certificate information item for the preceding certificate, the certificate information item for a respective certificate is accepted if the respective check has a positive outcome, the signature of the software is checked using the first key stored in the certificate information item for the last certificate, and the loaded software is accepted if this check also has a positive outcome.

It is an object of the invention to improve or simplify the use of motor vehicles. In particular, it is an object of the invention to simplify or improve the use or the usability of a mobile telephone by means of devices in the motor vehicle. In particular, it is an object of the invention to allow an improved terminal mode in connection with motor vehicles. In particular, it is an object of the invention to improve the method and system disclosed in U.S. Pat. No. 7,324,833 B2.

SUMMARY

The aforementioned object is achieved by a method for the use of a mobile appliance which is not associated with a motor vehicle using a motor vehicle, wherein a program which can be executed on the mobile appliance and a digital certificate associated with the program are stored in the mobile appliance, wherein the digital certificate is transmitted from the mobile appliance to the motor vehicle, wherein the digital certificate is verified in the motor vehicle, wherein—if verification of the digital certificate is successful—information associated with the program which can be executed on the mobile appliance is presented using a display in the motor vehicle, and wherein the program which can be executed on the mobile appliance is used using a user arrangement, associated with the display, in the motor vehicle.

A display within the context of the invention is a matrix display, in particular. A display within the context of the invention may be a TFT or an equivalent display apparatus, for example. A display within the context of the invention is a display integrated in a steering wheel and/or a display integrated next to a steering wheel in a central console or a dashboard or may comprise such a display or such displays, for example. A user arrangement within the context of the invention may be or comprise a touchscreen arranged in front of the display, for example. Alternatively or in addition, a user arrangement within the context of the invention may also be or comprise a user element which is physically separate from the display or a group of such user elements, for example. Such a user element may be a rotary knob, for example, as shown by way of example in FIG. 5. A motor vehicle within the context of the invention comprises a controller for the presentation of variable information (on the display) on the basis of user actions performed using the user arrangement, in particular.

In particular, provision is made for the user arrangement, particularly in conjunction with the display, to be able to be used to control functions of the motor vehicle. Within the context of the invention, a function of a motor vehicle is particularly the reception frequency of a radio, the volume of an audible output in the motor vehicle, a sound setting (nature and balance), a map detail selection, a title selection, a destination selection and/or a temperature setting. A function of a motor vehicle within the context of the invention is particularly a function for which it is necessary to arrive at a target value from a selection of, in particular continuous, values. A function of a motor vehicle within the context of the invention is particularly a function which can be adjusted in analog fashion, particularly following a scale. In one advantageous refinement of the invention, the function of the motor vehicle comprises scrolling through a list. In another advantageous refinement of the invention, the function of the motor vehicle comprises displacing a map detail. In another advantageous refinement of the invention, the function of the motor vehicle comprises scaling a map detail. In another advantageous refinement of the invention, the function of the motor vehicle comprises moving an element presented on the display.

Within the context of the invention, a mobile appliance which is not associated with the motor vehicle is meant in particular to be an appliance which is not related to the motor vehicle. A mobile appliance which is not associated with the motor vehicle within the context of the invention is meant particularly to be an appliance which can be used in conjunction with or in conjunction with a plurality of motor vehicles. Within the context of the invention, a mobile appliance which is not associated with the motor vehicle is meant particularly to be a mobile appliance, the principal purpose of which is not related to the or a motor vehicle. Within the context of the invention, a mobile appliance which is not associated with the motor vehicle is meant particularly to be a mobile telephone, a PDA, an MP3 player or a notebook or to comprise a functionality of such a device. A mobile appliance which is not associated with a motor vehicle within the context of the invention is particularly a portable electronic device as per U.S. Pat. No. 7,324,833 B2.

Within the context of the invention, verification is performed using a private key, in particular. Such a private key is advantageously stored in the motor vehicle in this case.

By way of example, provision may be made for the transmission of the digital certificate from the mobile appliance to the motor vehicle to be initiated by virtue of the program which can be executed on the mobile appliance being started on the mobile appliance. Such starting can be effected as a result of user actions using user elements of the mobile appliance, for example.

The program which can be executed on the mobile appliance remains on the mobile appliance, in particular. The program which can be executed on the mobile appliance is not transferred (as such) to the motor vehicle, in particular.

In a further refinement of the invention, the digital certificate is issued using a certification server beforehand. In a further refinement of the invention, the digital certificate is associated with the program which can be executed on the mobile appliance using the certification server. In a further refinement of the invention, the program which can be executed on the mobile appliance and the digital certificate associated with the program which can be executed on the mobile appliance are transmitted to the mobile appliance using the certification server or the program which can be executed on the mobile appliance and the digital certificate associated with the program which can be executed on the mobile appliance are transmitted from the certification server to the mobile appliance.

In a further refinement of the invention, the digital certificate is associated with the program which can be executed on the mobile appliance. In a further refinement of the invention, the program which can be executed on the mobile appliance and the digital certificate associated with the program which can be executed on the mobile appliance are transmitted to the mobile appliance.

In a further refinement of the invention, the program which can be executed on the mobile appliance is transmitted to the certification server beforehand.

In a further refinement of the invention, of data for the presentation of the information associated by the program which can be executed on the mobile appliance are transferred from the mobile appliance to the motor vehicle. In a further refinement of the invention, a command produced using the user arrangement in the motor vehicle is transferred from the motor vehicle to the mobile appliance. In a further refinement of the invention, the program which can be executed on the mobile appliance is controlled on the basis of the command.

The aforementioned object is—particularly in connection with one or more of the aforementioned variant refinements—also achieved by a method for the presentation of information in a motor vehicle, wherein a program which can be executed on a mobile appliance which is not associated with the motor vehicle and a digital certificate associated with the program are stored in the mobile appliance, wherein the digital certificate is transmitted from the mobile appliance to the motor vehicle, wherein the digital certificate is verified in the motor vehicle, and wherein, if verification of the digital certificate is successful, information associated with the program which can be executed on the mobile appliance is presented using a display in the motor vehicle.

In a further refinement of the invention, the digital certificate is issued using a certification server beforehand. In a further refinement of the invention, the digital certificate is associated with the program which can be executed on the mobile appliance using the certification server. In a further refinement of the invention, the program which can be executed on the mobile appliance and the digital certificate associated with the program which can be executed on the mobile appliance are transmitted to the mobile appliance using the certification server, or the program which can be executed on the mobile appliance and the digital certificate associated with the program which can be executed on the mobile appliance are transmitted from the certification server to the mobile appliance.

In a further refinement of the invention, the digital certificate is associated with the program which can be executed on the mobile appliance. In a further refinement of the invention, the program which can be executed on the mobile appliance and the digital certificate associated with the program which can be executed on the mobile appliance are transmitted to the mobile appliance.

In a further refinement of the invention, the program which can be executed on the mobile appliance is transmitted to the certification server beforehand.

In a further refinement of the invention, data for the presentation of the information associated by the program which can be executed on the mobile appliance are transferred from the mobile appliance to the motor vehicle.

A motor vehicle within the context of the invention is particularly a land vehicle which can be used individually in road traffic. Motor vehicles within the context of the invention are particularly not limited to land vehicles with an internal combustion engine.

Further advantages and details can be found in the description of exemplary embodiments which follows.

DETAILED DESCRIPTION OF PREFERRED EXEMPLARY EMBODIMENTS

Figure 1:
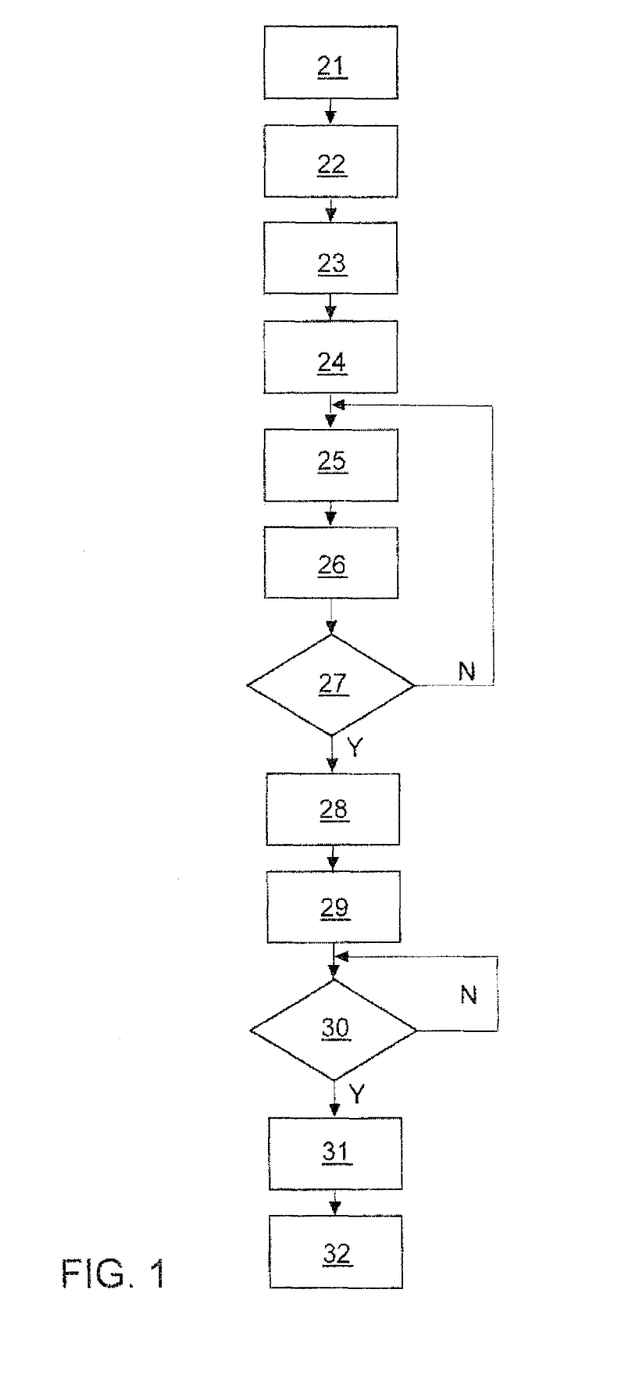
FIG. 1 shows an exemplary embodiment of a method for the use of a mobile appliance using a motor vehicle.
Figure 2:
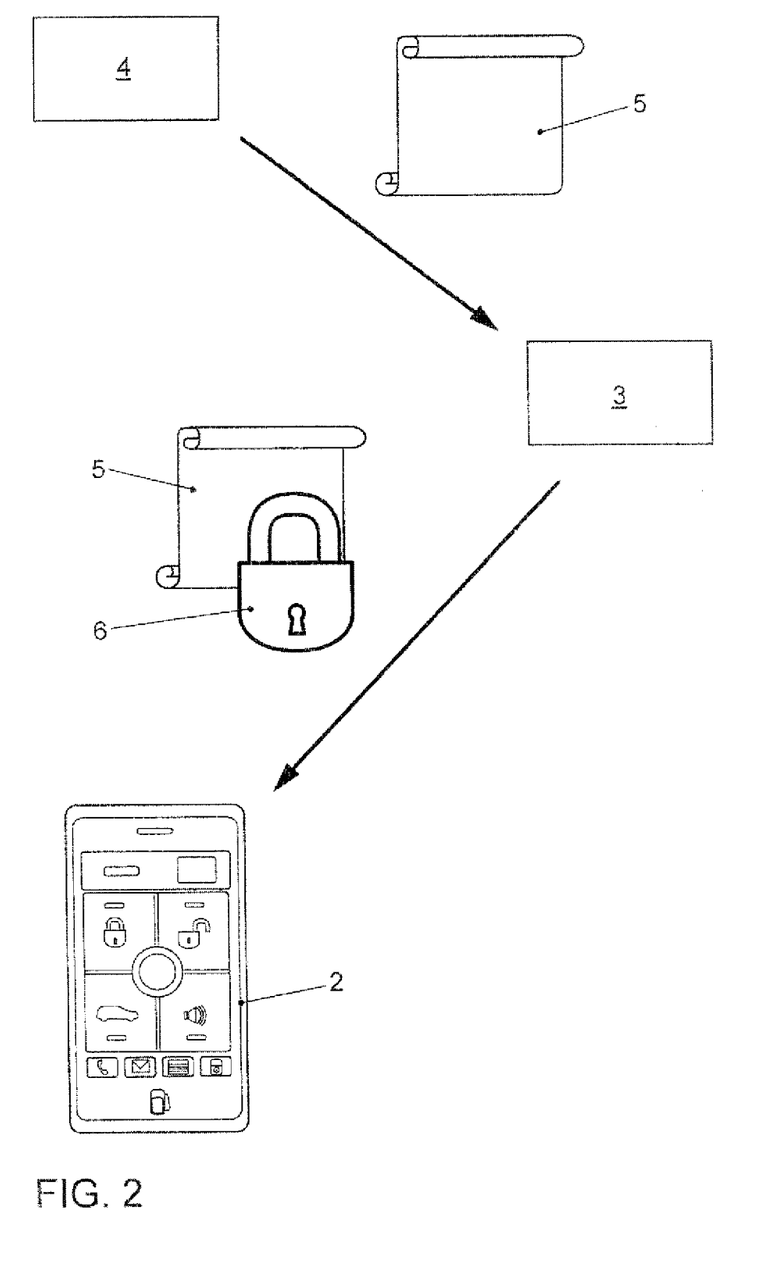
FIG. 2 shows an exemplary embodiment for the transfer of data from a certification server to a mobile appliance.
Figure 3:
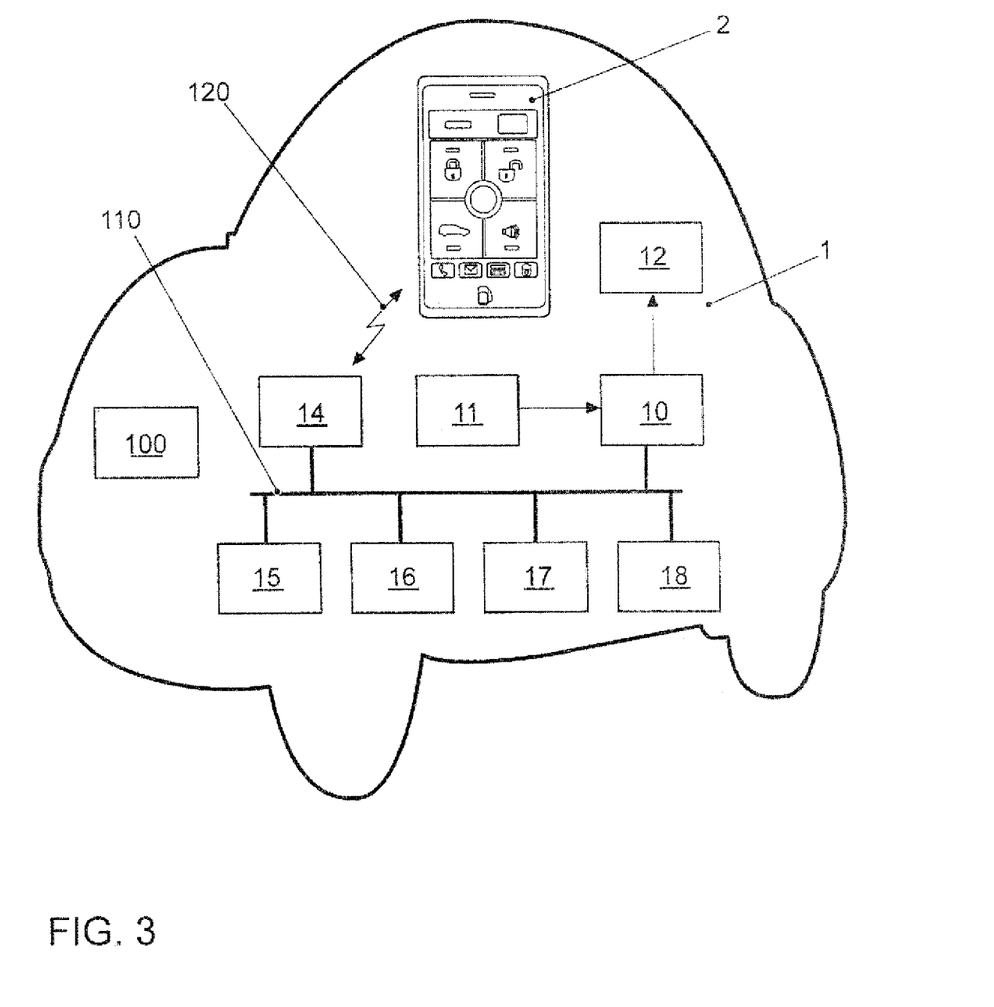
FIG. 3 shows a basic illustration of an exemplary embodiment of a motor vehicle.

FIG. 1 shows an exemplary embodiment of a method for the use of a mobile appliance 2 as shown in FIG. 2 and FIG. 3 using a motor vehicle 1, wherein the mobile appliance 2 is a mobile appliance which is not associated with a motor vehicle 1, that is to say a mobile appliance which is independent of the motor vehicle 1. In an exemplary refinement, the mobile appliance 2 is in the form of a mobile telephone or comprises functions of a mobile telephone. As shown in FIG. 3, the motor vehicle 1 comprises a display 12, which is actuated using a display and user controller 10, and also a user arrangement 11 which is associated with the display 12 and which can be used to influence the display 12 or the information presented thereon via the display and user controller 10. By way of example, the user arrangement 11 may be or comprise a touchscreen arranged in front of the display 12. Alternatively or in addition, the user arrangement 11 may also be or comprise a user element which is arranged spatially from the display 12, as shown by way of example in FIG. 5 as a rotary knob 106. The user arrangement 11 can be used to actuate functions of the motor vehicle 1, such as a telephone interface 14, an automatic air-conditioning system 15, a navigation system 16, an infotainment system 17 or further functions 18. To this end, the telephone interface 14, the automatic air-conditioning system 15, the navigation system 16, the infotainment system 17 and the extended functions 18 are connected to the display and user controller 10 by means of a bus system 110 for the purpose of data interchange.

The telephone interface 14 can be used by the motor vehicle 1 to communicate with the mobile appliance 2. By way of example, appropriate communication can take place in a manner as shown in EP 760 188 B1 and/or EP 0 559 182 B1. Advantageously, the communication between the telephone interface 14 and the mobile appliance 2 takes place wirelessly, however, particularly via a Bluetooth-like connection or Bluetooth link 120.

The method shown in FIG. 1 starts at a step 21, in which a program 5 which can be executed on the mobile appliance 2 is transmitted from a request server 4 to a certification server 3.

In a further step 22, a digital certificate 6 is issued using a certification server 3. In addition, the digital certificate 6 is associated with the program 5 (using the certification server 3) which can be executed on the mobile appliance 2. A digital certificate (also certificate or public key certificate), such as the digital certificate 6, comprises, in particular, structured data which confirm the owner and further properties of a public key. A digital certificate of this kind allows, by way of example, users of an asymmetric cryptosystem to associate the public key with an identity (e.g. with a person, an organization or an IT system) and to determine the scope of said key. A digital certificate within the context of the invention contains one or more of the following information items, in particular:

the name (or another explicit descriptor) of the issuer of the certificate information about the rules and the methods under which the certificate has been issued information about the validity period of the certificate the public key in respect of which the certificate provides information. The name (or another explicit descriptor) of the owner of the public key (subject)

further information about the owner of the public key details about the admissible field of application and scope of the public key a digital signature from the issuer about all the other information.

In a further step 23, the program 5 which can be executed on the mobile appliance 2 and the digital certificate 6 associated with the program 5 which can be executed on the mobile appliance 2 are—as shown in FIG. 2—transmitted from the certification server 3 to the mobile appliance 2. In addition, in a further step 24, the program 5 which can be executed on the mobile appliance 2 and the digital certificate 6 associated with the program are stored in the mobile appliance 2.

Figure 4:
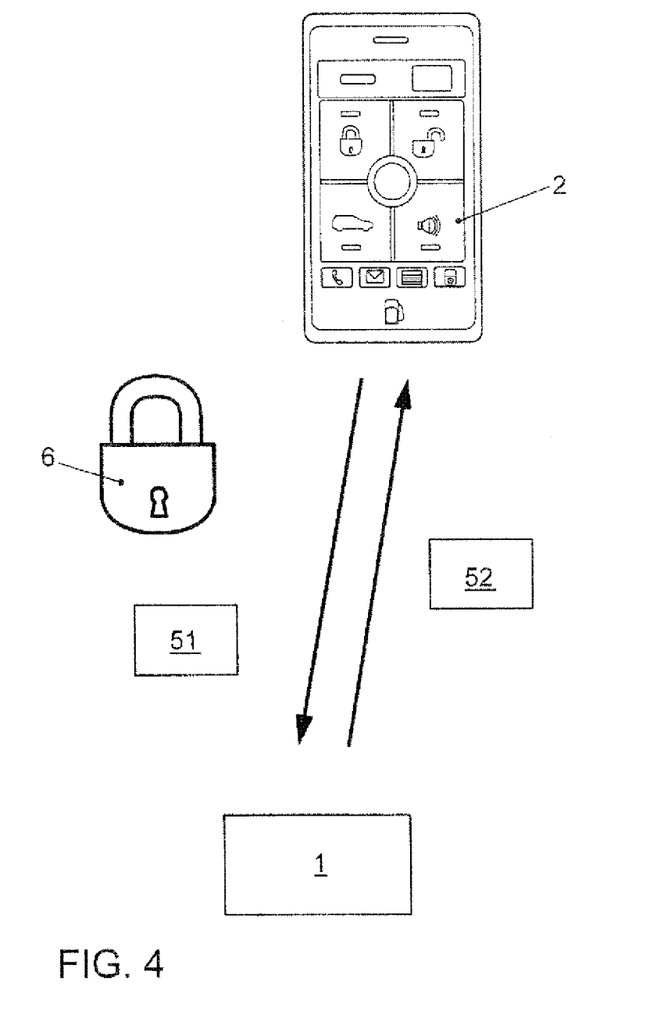
FIG. 4 shows an exemplary embodiment of data interchange between a motor vehicle and a mobile appliance.

In a further step 25, the program 5 which can be executed on the mobile appliance 2 is started on the mobile appliance 2. In addition, the digital certificate 6 is—as shown in FIG. 4—transmitted from the mobile appliance 2 to the motor vehicle 1 using the Bluetooth link 120 and is verified by said motor vehicle in a further step 26. In this context, the digital certificate 6 is verified using a private key 100 which is stored in the motor vehicle 1. Provision may be made for the private key 100 to be stored in the telephone interface 14 or in the display and user controller 10. If verification of the digital certificate is unsuccessful—cf. test 27—then step 25 is repeated or the method described is terminated.

If verification of the digital certificate is successful—cf. test 27—then the Bluetooth link 120 is used to perform a handshake between the mobile appliance 2 and the motor vehicle 1 or the telephone interface 14 thereof. In addition, data 51 for the presentation of the information associated by the program 5 which can be executed on the mobile appliance 2 are—as shown in FIG. 4—transferred from the mobile appliance 2 to the motor vehicle 1 using the Bluetooth link 120 in a step 28. The data 51 may be or comprise the interface information according to U.S. Pat. No. 7,324,833 B2, for example.

In a further step 29, the information associated with the program 5 which can be executed on the mobile appliance 2 is presented using the display 12 in the motor vehicle 1. If, while the information associated with the program which can be executed on the mobile appliance 2 is being presented using the display 12 in the motor vehicle, the user arrangement 11 is used in a manner which is associated within the context of said information (test 30) then, in a further step 31, an appropriate command 52 produced using the user arrangement 11 in the motor vehicle 1 is transferred from the motor vehicle 1 to the mobile appliance 2 using the Bluetooth link 120. In addition, in a step 32, the program which can be executed on the mobile appliance 2 is controlled or used on the basis of the command 52.

In this way, the mobile appliance 2 or the relevant program 5 which can be executed on the mobile appliance 2 can be used in conjunction with the display 12 in the motor vehicle 1 and the user arrangement 11 (terminal mode).

Figure 5:
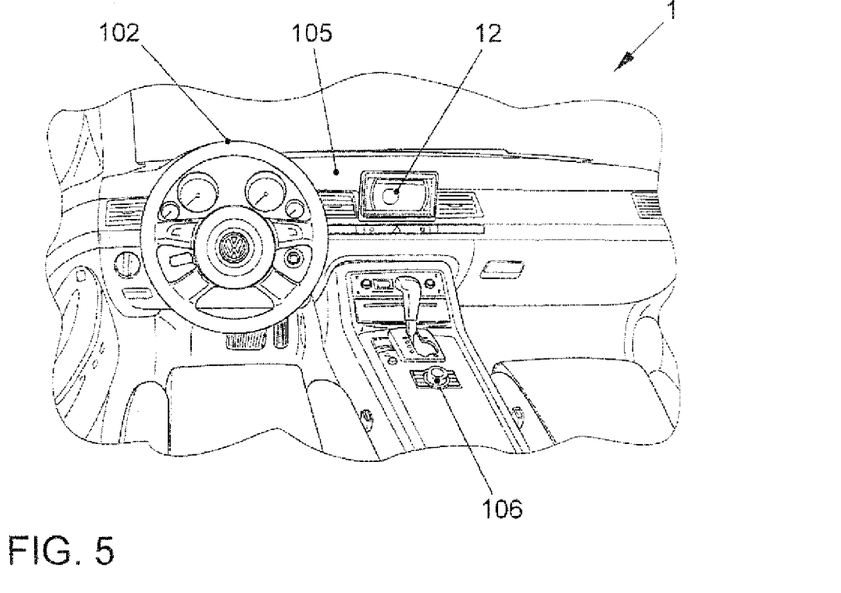
FIG. 5 shows an internal view of details from the motor vehicle shown in FIG. 3.

In particular, as shown in FIG. 5, the display 12 is arranged next to the steering wheel 102 of the motor vehicle 1 on the dashboard 105 thereof.

Figure 6:
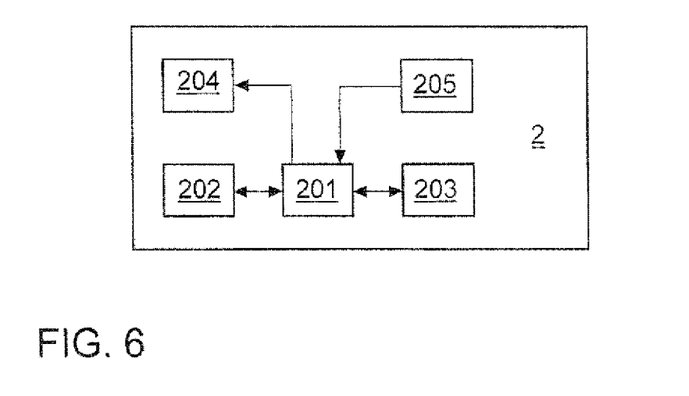
FIG. 6 shows a basic illustration of an exemplary embodiment of a mobile appliance.

FIG. 6 shows a schematic illustration of the mobile appliance 2, which has a Bluetooth interface 202 for the purpose of setting up and maintaining the Bluetooth link 120 between the telephone controller 14 and the mobile appliance 2. Reference symbol 201 denotes a controller of the mobile appliance 2, reference symbol 204 denotes a display of the mobile appliance 2, reference symbol 203 denotes a mobile telephone interface and reference symbol 205 denotes user elements of the mobile appliance 2. The user elements 205 of the mobile appliance 2 are in the form of a touchscreen above the display 204, in particular. The program 5 which can be executed on the mobile appliance 2 can be used using the user elements 205 of the mobile appliance 2, which are in the form of a touchscreen, in particular. At the same time or alternatively, in accordance with the method described, it can be used using the user arrangement 11 in the motor vehicle 1.

The method described is particularly suitable for a terminal mode for a mobile appliance which can be used exclusively, in particular, using a touchscreen integrated in the mobile appliance (that is to say that it has no further user elements which can be used to use the relevant program which can be executed on the mobile appliance), but which is intended to be used in the terminal mode using a user apparatus in the motor vehicle, said user apparatus not comprising or being a touchscreen, in particular a touchscreen arranged above the display 12 of the motor vehicle 1. In this case, the method described is particularly suitable for safeguarding a function in the terminal mode when said appliance is used using pushbutton switches or rotary knobs in the motor vehicle.

The invention claimed is:

1. A method for the use of a mobile appliance that is not associated with a motor vehicle but uses a motor vehicle, the method comprising:
    storing a program to be executed on the mobile appliance and a public key certificate associated with the program in the mobile appliance, wherein the public key certificate has been issued by a certification server, wherein the public key certificate associates a public key with an identity and a scope of the public key and the public key certificate includes the public key itself;
    transmitting the public key of the public key certificate from the mobile appliance to the motor vehicle via a communication link;
    verifying the public key in the motor vehicle using a private key which is stored in the motor vehicle; and
    only if verification is successful:
        using the communication link to perform a handshake between the mobile appliance and the motor vehicle,
        presenting information associated with the program executed on the mobile appliance using a display in the motor vehicle, and
        controlling use of the program executed on the mobile appliance using a user arrangement included in the motor vehicle and associated with the motor vehicle display, wherein the user arrangement is configured to be used to actuate vehicle specific functions, wherein the method results in control of the functionality of the program executed on the mobile appliance, and display of data associated with the program executed on the mobile appliance on the motor vehicle display,
        detecting when the data associated with the program executed on the mobile appliance is being presented using the motor vehicle display;
        when it is determined that the data associated with the program executed on the mobile appliance is being presented using the motor vehicle display, interpreting user input received via the user arrangement included in the motor vehicle as a command to control the program executed on the mobile appliance rather than a command to actuate vehicle specific functions; and
        transferring the command to the program executed on the mobile appliance to control the program.

2. The method of claim 1, wherein the private key is stored in one of a telephone interface included in the motor vehicle, in the display or the user arrangement.

3. The method of claim 2, further comprising associating the public key certificate with the program using the certification server.

4. The method of claim 3, further comprising transmitting the program and transmitting the public key certificate associated with the program using the certification server to the mobile appliance.

5. The method of claim 2, further comprising associating the public key certificate with the program.

6. The method of claim 5, further comprising transmitting the program and transmitting the public key certificate associated with the program to the mobile appliance.

7. The method of claim 2, further comprising transmitting the program to the certification server prior to transmitting the program from the certification server to the mobile appliance.

8. The method of claim 1, further comprising transferring data for the presentation of the information associated with the program from the mobile appliance to the motor vehicle.

9. The method of claim 1, further comprising controlling the program based on the command.

10. A method for presenting information in a motor vehicle, the method comprising:
    storing a program to be executed on the mobile appliance and a public key certificate associated with the program in the mobile appliance, wherein the public key certificate has been issued by a certification server, wherein the public key certificate associates a public key with an identity and a scope of the public key and the public key certificate includes the public key itself;

transmitting the public key of the public key certificate from the mobile appliance to the motor vehicle via a communication link;

verifying the public key in the motor vehicle using a private key which is stored in the motor vehicle; and only if verification of the public key is successful:
  using the communication link to perform a handshake between the mobile appliance and the motor vehicle,
  presenting information associated with the program executed on the mobile appliance using a display in the motor vehicle, and
  receiving at least one control command for control of the program executed on the mobile appliance via a user arrangement included in the motor vehicle and associated with the motor vehicle display, wherein the user arrangement is configured to be used to actuate vehicle specific functions, wherein the method results in control of the functionality of the program executed on the mobile appliance, and display of data associated with the program executed on the mobile appliance on the motor vehicle display, detecting when the data associated with the program executed on the mobile appliance is being presented using the motor vehicle display;

when it is determined that the data associated with the program executed on the mobile appliance is being presented using the motor vehicle display, interpreting user input received via the user arrangement included in the motor vehicle as a command to control the program executed on the mobile appliance rather than a command to actuate vehicle specific functions; and transferring the command to the program executed on the mobile appliance to control the program.

11. The method of claim 10, wherein the private key is stored in one of a telephone interface included in the motor vehicle, in the display or the user arrangement.

12. The method of claim 11, further comprising associating the public key certificate with the program using the certification server.

13. The method of claim 12, further comprising transmitting the program and transmitting the public key certificate associated with the program using the certification server.

14. The method of claim 11, further comprising associating the public key certificate with the program.

15. The method of claim 14, further comprising transmitting the program and transmitting the public key certificate associated with the program.

16. The method of claim 11, further comprising transmitting the program to the certification server prior to storing the program on the mobile appliance.

17. The method of claim 10, further comprising transferring data for the presentation of the information associated by the program from the mobile appliance to the motor vehicle.

18. Equipment for utilizing a mobile appliance that is not associated with a motor vehicle, the equipment comprising:
  means for verifying a public key in the motor vehicle using a private key which is stored in the motor vehicle, wherein the public key certificate has been issued by a certification server that issues public key certificates and associates the public key certificate with programs to be executed by mobile appliances, wherein the public key certificate associates a public key with an identity and a scope of the public key and the public key certificate includes the public key itself, wherein the certification server has transmitted the public key certificate and the associated program to the mobile appliance, wherein the program and the public key certificate associated with the program are stored in the mobile appliance, and wherein the public key is received from the mobile appliance at the motor vehicle via a communication link, and only if verification of the public key of the public key certificate is successful, using the Bluetooth link to perform a handshake between the mobile appliance and the motor vehicle;

a display included in the motor vehicle that presents information associated with the program executed on the mobile appliance only if the verification of the digital certificate is successful, and a user arrangement installed in the motor vehicle and associated with the display, wherein the user arrangement is configured to be used to actuate vehicle specific functions, wherein the motor vehicle installed user arrangement also controls use of the program executed on the mobile appliance program executed on the mobile appliance, and display of data associated with the program executed on the mobile appliance on the motor vehicle display, and wherein if it is determined that the data associated with the program executed on the mobile appliance is being presented using the motor vehicle display, user input received via the user arrangement included in the motor vehicle is interpreted as a command to control the program executed on the mobile appliance rather than a command to actuate vehicle specific functions and the received command is transferred to the program executed on the mobile appliance to control the program.

19. The equipment of claim 18, wherein the private key is stored in one of a telephone interface included in the motor vehicle, in the display or the user arrangement.

20. The equipment of claim 19, wherein the public key certificate is associated with the program using the certification server.

21. The equipment of claim 18, further comprising means for transmitting the program and transmitting the public key certificate associated with the program to the mobile appliance.

22. The equipment of claim 18, further comprising means for receiving data transferred from the mobile appliance for the presentation of the information associated by the program at the motor vehicle.

23. The method of claim 1, wherein the communication link is a Bluetooth link.

24. The method of claim 10, wherein the communication link is a Bluetooth link.

25. The equipment of claim 18, wherein the communication link is a Bluetooth link.

* * * * *